US009360582B2

(12) United States Patent
Bittar et al.

(10) Patent No.: US 9,360,582 B2
(45) Date of Patent: Jun. 7, 2016

(54) CORRECTING FOR MAGNETIC INTERFERENCE IN AZIMUTHAL TOOL MEASUREMENTS

(75) Inventors: Michael S. Bittar, Houston, TX (US);
Hsu-Hsiang Wu, Sugarland, TX (US);
Christopher Golla, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 887 days.

(21) Appl. No.: 13/175,514

(22) Filed: Jul. 1, 2011

(65) Prior Publication Data

US 2012/0001637 A1    Jan. 5, 2012

Related U.S. Application Data

(60) Provisional application No. 61/361,199, filed on Jul. 2, 2010.

(51) Int. Cl.
*G01V 3/26* (2006.01)
*G01V 3/28* (2006.01)

(52) U.S. Cl.
CPC .......................................... *G01V 3/28* (2013.01)

(58) Field of Classification Search
CPC .............................. G01R 29/0814; E21B 47/00
See application file for complete search history.

(56) References Cited

U.S. PATENT DOCUMENTS

| | | | |
|---|---|---|---|
| 3,614,600 A | 10/1971 | Ronka et al. | |
| 4,472,684 A | 9/1984 | Schuster | |
| 4,502,010 A | 2/1985 | Kuckes | |
| 4,605,268 A | 8/1986 | Meador | |
| 4,700,142 A | 10/1987 | Kuckes | |
| 4,845,434 A | 7/1989 | Kuckes et al. | |
| 4,933,640 A | 6/1990 | Kuckes | |
| 5,138,313 A | 8/1992 | Barrington | |

(Continued)

FOREIGN PATENT DOCUMENTS

| EP | 1315984 | 1/2011 |
|---|---|---|
| EP | 1155343 | 3/2011 |

(Continued)

OTHER PUBLICATIONS

Bittar, Michael S., "Resistivity Logging with Reduced Dip Artifacts", PCT Appl No. US2007/075455, filed Aug. 8, 2006, 17 pgs.

(Continued)

*Primary Examiner* — Tung X Nguyen
*Assistant Examiner* — Feba Pothen
(74) *Attorney, Agent, or Firm* — Krueger Iselin LLP; Benjamin Fite

(57) ABSTRACT

Methods and systems that compensate for magnetic interference in azimuthal tool measurements. At least some method embodiments include a downhole logging method that includes taking measurements as a function of orientation from inside a borehole. The measurements are associated with different azimuthal bins, and an azimuthal direction is determined for each azimuthal bin. Because the tool rotates at a constant rate, the relative number of measurements associated which the different bins can be used to measure the effective sizes of the different bins and to redetermine the effective angles of the bins in the presence of magnetic interference. The tool measurements may include, but are not limited to, formation resistivity, magnetic field, and formation density.

20 Claims, 6 Drawing Sheets

(56) References Cited

U.S. PATENT DOCUMENTS

| | | | |
|---|---|---|---|
| 5,200,705 | A | 4/1993 | Clark et al. |
| 5,339,036 | A | 8/1994 | Clark et al. |
| 5,389,881 | A | 2/1995 | Bittar et al. |
| 5,541,517 | A | 7/1996 | Hartmann |
| 5,720,355 | A | 2/1998 | Lamine et al. |
| 5,892,460 | A | 4/1999 | Jerabek et al. |
| 6,098,727 | A | 8/2000 | Ringgenberg et al. |
| 6,163,155 | A | 12/2000 | Bittar |
| 6,191,586 | B1 | 2/2001 | Bittar |
| 6,215,120 | B1 * | 4/2001 | Gadeken et al. ............. 250/256 |
| 6,218,842 | B1 | 4/2001 | Bittar |
| 6,257,334 | B1 | 7/2001 | Cyr |
| 6,353,321 | B1 | 3/2002 | Bittar |
| 6,359,438 | B1 | 3/2002 | Bittar |
| 6,405,136 | B1 | 6/2002 | Li et al. |
| 6,476,609 | B1 | 11/2002 | Bittar |
| 6,508,316 | B2 | 1/2003 | Estes et al. |
| 6,538,447 | B2 | 3/2003 | Bittar |
| 6,584,837 | B2 * | 7/2003 | Kurkoski ................... 73/152.02 |
| 6,630,831 | B2 | 10/2003 | Amini |
| 6,646,441 | B2 | 11/2003 | Thompson et al. |
| 6,810,331 | B2 | 10/2004 | Bittar et al. |
| 6,885,943 | B2 | 4/2005 | Bittar et al. |
| 6,911,824 | B2 | 6/2005 | Bittar |
| 6,944,546 | B2 | 9/2005 | Xiao et al. |
| 7,019,528 | B2 | 3/2006 | Bittar |
| 7,038,455 | B2 | 5/2006 | Beste et al. |
| 7,046,010 | B2 | 5/2006 | Hu et al. |
| 7,098,664 | B2 | 8/2006 | Bittar et al. |
| 7,098,858 | B2 | 8/2006 | Bittar et al. |
| 7,133,779 | B2 * | 11/2006 | Tilke et al. ........................ 702/9 |
| 7,138,803 | B2 | 11/2006 | Bittar |
| 7,227,363 | B2 | 6/2007 | Gianzero et al. |
| 7,265,552 | B2 | 9/2007 | Bittar |
| 7,268,019 | B2 | 9/2007 | Golla et al. |
| 7,301,223 | B2 | 11/2007 | Rodney et al. |
| 7,345,487 | B2 | 3/2008 | Bittar et al. |
| 7,382,135 | B2 | 6/2008 | Li et al. |
| 7,385,400 | B2 * | 6/2008 | Moore ........................ 324/338 |
| 7,427,862 | B2 | 9/2008 | Dashevsky et al. |
| 7,427,863 | B2 | 9/2008 | Bittar |
| 7,477,162 | B2 | 1/2009 | Clark |
| 7,557,579 | B2 | 7/2009 | Bittar |
| 7,557,580 | B2 | 7/2009 | Bittar |
| 7,659,722 | B2 | 2/2010 | Bittar |
| 7,746,078 | B2 | 6/2010 | Bittar et al. |
| 7,755,361 | B2 * | 7/2010 | Seydoux et al. .............. 324/333 |
| 7,812,610 | B2 | 10/2010 | Clark et al. |
| 7,839,148 | B2 | 11/2010 | Vehra et al. |
| 7,839,346 | B2 | 11/2010 | Bittar et al. |
| 7,912,648 | B2 | 3/2011 | Tang et al. |
| 7,948,238 | B2 | 5/2011 | Bittar |
| 8,026,722 | B2 | 9/2011 | McElhinney |
| 8,159,227 | B2 | 4/2012 | Wang |
| 8,499,830 | B2 | 8/2013 | Alberty |
| 8,844,648 | B2 | 9/2014 | Bittar et al. |
| 2003/0137301 | A1 | 7/2003 | Thompson et al. |
| 2005/0134280 | A1 | 6/2005 | Bittar et al. |
| 2006/0022887 | A1 | 2/2006 | Bittar |
| 2006/0033502 | A1 | 2/2006 | Bittar |
| 2006/0054354 | A1 | 3/2006 | Orban |
| 2006/0244455 | A1 | 11/2006 | Bittar |
| 2006/0255811 | A1 | 11/2006 | Bittar et al. |
| 2007/0075874 | A1 | 4/2007 | Shah et al. |
| 2007/0152054 | A1 * | 7/2007 | Bonavides et al. ........... 235/454 |
| 2007/0235225 | A1 | 10/2007 | Bittar |
| 2008/0078580 | A1 | 4/2008 | Bittar |
| 2008/0120035 | A1 * | 5/2008 | Hassan et al. .................. 702/10 |
| 2008/0315884 | A1 | 12/2008 | Bittar et al. |
| 2009/0015260 | A1 | 1/2009 | Bittar |
| 2009/0066336 | A1 * | 3/2009 | Dion ........................ 324/355 |
| 2009/0164127 | A1 | 6/2009 | Clark |
| 2009/0179647 | A1 | 7/2009 | Wang et al. |
| 2009/0224764 | A1 | 9/2009 | Bittar |
| 2009/0230968 | A1 | 9/2009 | Bittar et al. |
| 2009/0302851 | A1 | 12/2009 | Bittar et al. |
| 2009/0309798 | A1 | 12/2009 | Bittar et al. |
| 2011/0221442 | A1 | 9/2011 | Maurer et al. |
| 2011/0308794 | A1 | 12/2011 | Bittar et al. |
| 2011/0309836 | A1 | 12/2011 | Bittar et al. |
| 2015/0137817 | A1 | 5/2015 | Wilson et al. |

FOREIGN PATENT DOCUMENTS

| | | |
|---|---|---|
| GB | 2441033 | 2/2008 |
| GB | 2481506 | 12/2011 |
| WO | WO-2007/7149106 | 12/2007 |
| WO | WO-2008/008346 | 1/2008 |
| WO | WO-2008/008386 | 1/2008 |
| WO | WO-2008/021868 | 2/2008 |
| WO | WO-2008/036077 | 3/2008 |
| WO | WO-2009/014882 | 1/2009 |
| WO | WO-2009/091408 | 7/2009 |
| WO | WO-2009/131584 | 10/2009 |
| WO | WO-2010/006302 | 1/2010 |
| WO | WO-2010/065208 | 6/2010 |
| WO | WO-2010/075237 | 7/2010 |
| WO | WO-2011/049828 | 4/2011 |

OTHER PUBLICATIONS

Bittar, Michael S., et al., "Int'l Search Report and Written Opinion", dated Oct. 8, 2009, Appl No. PCT/US09/053354, "A High Frequency Dielectric Measurement Tool", filed Aug. 11, 2009, 11 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999, 32 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/127,634, filed May 28, 2008, 32 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009, 30 pgs.

Bittar, Michael S., "Electromagnetic Wave Resistivity Tool Having a Tilted Antenna for Geosteering Within a Desired Payzone", U.S. Appl. No. 09/615,501, filed Jul. 13, 2000, 71 pgs.

Bittar, Michael S., "Electromagnetic Wave Resistivity Tool Having a Tilted Antenna for Geosteering Within a Desired Payzone", U.S. Appl. No. 10/255,048, filed Sep. 25, 2002, 71 pgs.

Bittar, Michael S., "Electromagnetic Wave Resistivity Tool Having a Tilted Antenna for Geosteering Within a Desired Payzone", U.S. Appl. No. 10/616,429, filed Jul. 9, 2003, 71 pgs.

Bittar, Michael S., "Electromagnetic Wave Resistivity Tool Having a Tilted Antenna for Geosteering Within a Desired Payzone", U.S. Appl. No. 11/198,068, filed Aug. 5, 2005, 71 pgs.

Bittar, Michael S., "Electromagnetic Wave Resistivity Tool Having a Tilted Antenna for Geosteering Within a Desired Payzone", U.S. Appl. No. 11/457,709, filed Jul. 14, 2006, 71 pgs.

Bittar, Michael S., "Electromagnetic Wave Resistivity Tool Having a Tilted Antenna for Geosteering Within a Desired Payzone", U.S. Appl. No. 11/745,822, filed May 8, 2007, 20 pgs.

Bittar, Michael S., "Electromagnetic Wave Resistivity Tool Having a Tilted Antenna for Geosteering Within a Desired Payzone", U.S. Appl. No. 12/127,672, filed May 27, 2008, 44 pgs.

Bittar, Michael S., "Electromagnetic Wave Resistivity Tool Having a Tilted Antenna for Geosteering Within a Desired Payzone", U.S. Appl. No. 12/467,434, filed May 18, 2009, 40 pgs.

Bittar, Michael S., et al., "A 3D Borehole Imager and a Dielectric Measurement Tool", PCT Appl No. US09/65537, filed Nov. 23, 2009, 13 pgs.

Bittar, Michael S., et al., "Antenna Coupling Component Measurement Tool Having a Rotating Antenna Configuration", PCT Appl No. US06/062149, filed Dec. 15, 2006, 26 pgs.

Bittar, Michael S., et al., "Antenna Coupling Component Measurement Tool Having a Rotating Antenna Configuration", U.S. Appl. No. 12/294,557, filed Sep. 25, 2008, 22 pgs.

(56) References Cited

OTHER PUBLICATIONS

Bittar, Michael S., et al., "EM-Guided Drilling Relative to an Existing Borehole", U.S. Appl. No. 12/526,552, filed Aug. 10, 2009, 13 pgs.
Bittar, Michael S., et al., "Look-Ahead Boundary Detection and Distance Measurement", U.S. Appl. No. 12/067,582, filed Mar. 20, 2008, 16 pgs.
Bittar, Michael S., et al., "Method and Apparatus for Building a Tilted Antenna", U.S. Appl. No. 12/306,954, filed Dec. 30, 2008, 13 pgs.
Bittar, Michael S., et al., "Method and Apparatus Having Antennas Configured to Measure Electrical Anisotropy", U.S. Appl. No. 12/088,061, filed Mar. 25, 2008, 16 pgs.
Bittar, Michael S., et al., "Method and Apparatus with High Resolution Electrode Configuration for Imaging in Oil-Based Muds", U.S. Appl. No. 12/680,868, filed Mar. 30, 2010, 16 pgs.
Bittar, Michael S., et al., "Methods and Apparatus for Detecting Deep Conductive Pipe", U.S. Appl. No. 13/106,032, filed May 12, 2011, 15 pgs.
Bittar, Michael S., et al., "Modular Geosteering Tool Assembly", U.S. Appl. No. 12/306,267, filed Dec. 23, 2008, 16 pgs.
Bittar, Michael S., et al., "Multimodal Geosteering Systems and Methods", U.S. Appl. No. 12/679,502, filed Mar. 23, 2010, 20 pgs.
Bittar, Michael S., et al., "Real Time Determination of Casing Location and Distance from Tilted "Antenna"", U.S. Appl. No. 13/116,150, filed May 26, 2011, 17 pgs.
Bittar, Michael S., et al., "Robust Inversion Systems and Methods for Azimuthally Sensitive Resistivity Logging Tools", U.S. Appl. No. 12/299,760, filed Nov. 5, 2008, 21 pgs.
Bittar, Michael S., et al., "Systems and Methods for Displaying Logging Data", U.S. Appl. No. 12/295,158, filed Sep. 29, 2008, 15 pgs.
Bittar, Michael S., et al., "Systems and Methods for EM Ranging in Oil-Based Mud", U.S. Appl. No. 13/116,069, filed May 26, 2011, Bittar Application, 16 pgs.
Bittar, Michael S., et al., "Systems and Methods Having Radially Offset Antennas for Electromagnetic Resistivity Logging", U.S. Appl. No. 12/300,876, filed Nov. 14, 2008), 16 pgs.
UK Combined Search and Examination Report, dated Jul. 18, 2011, Appl No. GB1109125.3, "Method and Apparatus for Detecting Deep Conductive Pipe", filed May 27, 2011, 7pgs.
UK Combined Search and Examination Report, dated Sep. 16, 2011, Application No. 1109401.8, "Real Time Determination of Casing Location and Distance with Tilted Antenna Measurement", filed Jun. 3, 2011, 5 pgs.

AU First Examination Report, dated Jan. 30, 2012, Appl No. 2011202215, "Method and Apparatus for Detecting Deep Conductive Pipe", filed May 13, 2011, 2 pgs.
AU First Examiner's Report, dated Mar. 7, 2012, Appl No. 2011202518, "Real Time Determination of Casing Location and Distance with Tilted Antenna Measurement", filed May 30, 2011, 2 pgs.
UK Office Action, dated Jul. 19, 2012, Appl No. GB1109125.3, "Method and Apparatus for Detecting Deep Conductive Pipe", filed May 27, 2011, 2pgs.
UK Examination Report, dated Aug. 8, 2012, Appl No. 1109401.8, "Real Time Determination of Casing Location and Distance with Tilted Antenna Measurement", filed Jun. 31, 2011, 2 pgs.
Non-Final Office Action, dated Jun. 11, 2013, U.S. Appl. No. 13/106,032, "Method and Apparatus for Detecting Deep Conductive Pipe", filed May 12, 2011, 18 pgs.
US Office Action, dated Aug. 16, 2013, U.S. Appl. No. 13/116,150, "Real Time Determination of Casing Location and Distance with Tilted Antenna Measurement", filed May 26, 2011, 7 pgs.
US Non-Final Office Action, dated Oct. 8, 2013, U.S. Appl. No. 13/116,069, "System and Method for EM Ranging in Oil-Based Mud", filed May 26, 2011, 12 pgs.
US Non-Final Office Action, dated Oct. 23, 2013, U.S. Appl. No. 13/116,150, "Real Time Determination of Casing Location and Distance with Tilted Antenna Measurement", filed May 26, 2011, 20 pgs.
US Non-Final Office Action, Dated Jan. 3, 2014, U.S. Appl. No. 13/106,032, "Method and Apparatus for Detecting Deep Conductive Pipe," filed May 12, 2011, 18 pgs.
"US Final Office Action", Dated Apr. 18, 2014, U.S. Appl. No. 13/116,069, "System and Method for EM Ranging in Oil-Based Mud," filed May 26, 2011, 8 pgs.
"US Final Office Action", Dated May 23, 2014, U.S. Appl. No. 13/106,032, "Method and Apparatus for Detecting Deep Conductive Pipe", filed May 12, 2011, 19 pgs.
CA Office Action, dated Mar. 26, 2015, U.S. Pat. No. 2,821,127, "Real-Time Casing Detection Using Tilted and Crossed Antenna Measurement," Filed Jul. 11, 2013, 4 pgs.
GCC Examination Report, dated Dec. 5, 2014, Appl No. GC 2011-18611, "Systems and Methods for EM Ranging in Oil-Based Mud", filed Jun. 18, 2011, 3 pgs.
GCC Examination Report, dated Dec. 5, 2014, Appl No. GC 2011-18610, "Method and Apparatus for Detecting Deep Conductive Pipe", filed Jun. 18, 2011, 5 pgs.

\* cited by examiner

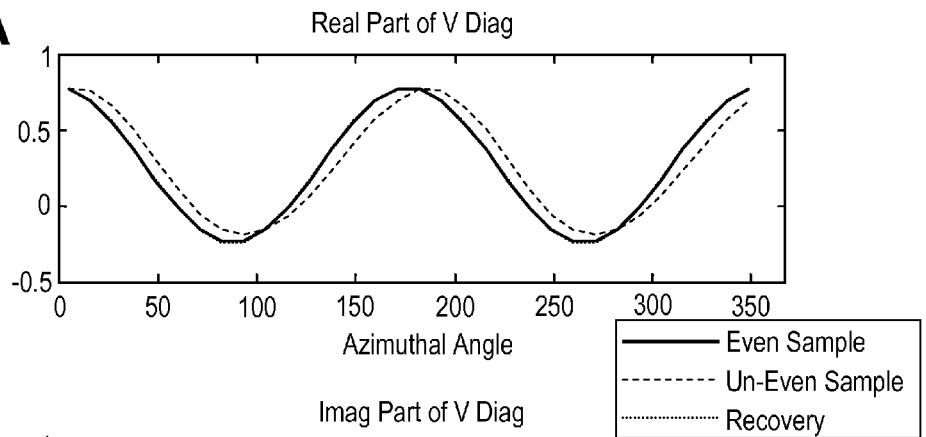
FIG. 7A
FIG. 7B
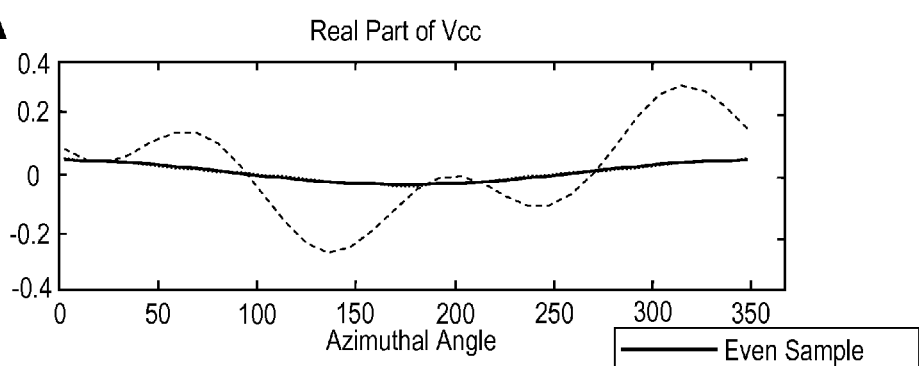
FIG. 8A
FIG. 8B

CORRECTING FOR MAGNETIC INTERFERENCE IN AZIMUTHAL TOOL MEASUREMENTS

CROSS-REFERENCE TO RELATED APPLICATIONS

This application claims priority to Provisional U.S. Application 61/361,199, titled "Systems and Methods to Correct Azimuthal Tool Measurements for Magnetic Casing Interference" and filed Jul. 2, 2010 by M. Bittar, H. Wu, and C. Golla, which is hereby incorporated herein by reference.

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. These techniques often involve drilling a borehole in close proximity to one or more existing wells. One such technique is steam-assisted gravity drainage ("SAGD") as described in U.S. Pat. No. 6,257,334, "Steam-Assisted Gravity Drainage Heavy Oil Recovery Process". SAGD uses pairs of horizontal wells spaced less than about 10 meters apart, and careful control of the spacing is important to the technique's effectiveness. Other examples of directed drilling near an existing well include intersection for blowout control, multiple wells drilled from an offshore platform, and closely spaced wells for geothermal energy recovery.

The detection of a nearby well is usually insufficient. Drillers often require an accurate determination of distance and direction to the nearby well, which determinations typically require the use of one or more azimuthally-sensitive tools. Such tools in turn require an orientation-monitoring mechanism, which usually includes one or more magnetometers whose measurements may be subject to interference from stray magnetic fields from, e.g., magnetization of the well casing or the presence of ferromagnetic minerals in the formation. Such interference has hereto been regarded as negligible and generally ignored, but the present inventors have determined that ranging direction and distance determinations can be substantially affected by such interference to the driller's detriment.

BRIEF DESCRIPTION OF THE DRAWINGS

A better understanding of the various disclosed system and method embodiments can be obtained when the following detailed description is considered in conjunction with the drawings, in which:

FIGS. 7A-7B compare an expected diagonal voltage response with illustrative responses subject to magnetic interference and compensated for magnetic interference;

FIG. 8A-8B compare an expected cross component voltage response with illustrative responses subject to magnetic interference and compensated for magnetic interference.

DETAILED DESCRIPTION

The issues identified in the background are at least in part addressed by the disclosed methods and systems that compensate for magnetic interference in azimuthal tool measurements. At least some method embodiments include a downhole logging method that includes taking measurements as a function of orientation from inside a borehole. The measurements are associated with different azimuthal bins, and an azimuthal direction is determined for each azimuthal bin. Because the tool rotates at a constant rate, the relative number of measurements associated which the different bins can be used to measure the effective sizes of the different bins and to redetermine the effective angles of the bins in the presence of magnetic interference. The tool measurements may include, but are not limited to, formation resistivity, magnetic field, and formation density.

Figure 1:
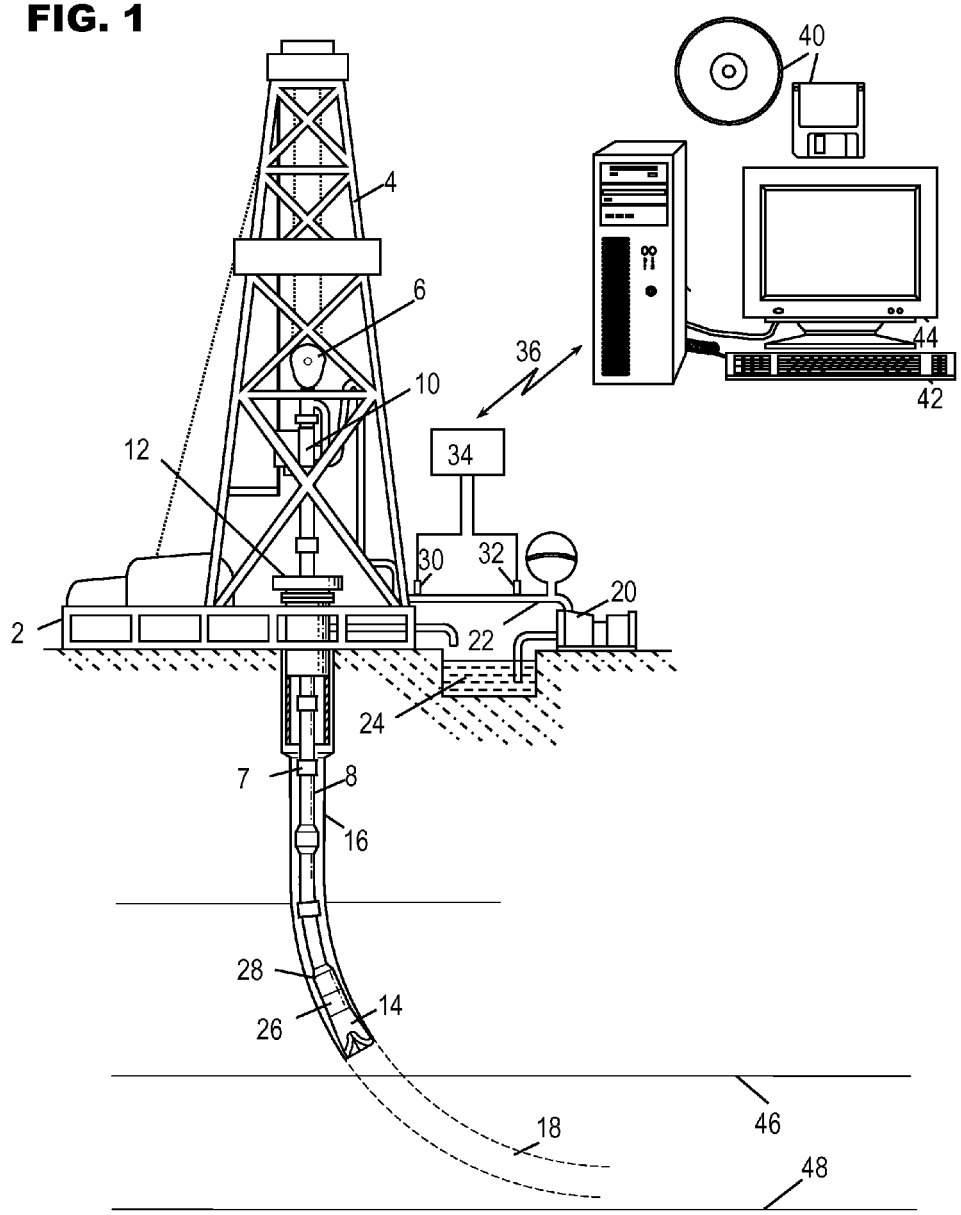
FIG. 1 shows an illustrative drilling environment where geosteering is employed.

To further assist the reader's understanding of the disclosed systems and methods, we describe an environment suitable for their use and operation. FIG. 1 shows an illustrative geosteering environment in which a drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. The drill bit 14 is just one piece of a bottom-hole assembly that typically includes one or more drill collars (thick-walled steel pipe) to provide weight and rigidity to aid the drilling process. Some of these drill collars may include logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by internal magnetometers, inclinometers, and/or accelerometers, though other sensor types such as gyroscopes may alternatively be used.

The system further includes a tool 26 to gather measurements of formation properties from which formation boundaries can be identified as discussed further below. Using these measurements in combination with the tool orientation measurements, the driller can steer the drill bit 14 along a desired path 18 using any one of various suitable directional drilling systems, including steering vanes, a "bent sub", and a rotary steerable system. A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity. Moreover, a telemetry sub 28 coupled to the downhole tools 26 can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that alternative forms of telemetry exist and may be used to communicate signals from downhole to the digitizer. Such telemetry may employ acoustic telemetry, electromagnetic telemetry, or telemetry via wired drillpipe.

The digitizer 34 supplies a digital form of the pressure signals via a communications link 36 to a computer 38 or some other form of a data processing device. Computer 38 operates in accordance with software (which may be stored on information storage media 40) and user input received via an input device 42 to process and decode the received signals. The resulting telemetry data may be further analyzed and processed by computer 38 to generate a display of useful information on a computer monitor 44 or some other form of a display device. For example, a driller could employ this system to obtain and monitor drilling parameters, formation properties including an azimuthal brittleness log, and the path of the borehole relative to detected formation boundaries 46 and 48 or, in a SAGD application, relative to an existing well.

Figure 2:
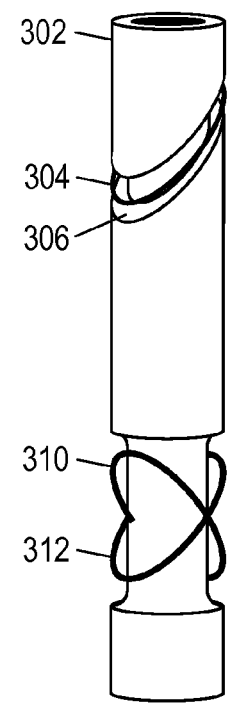
FIG. 2 shows an illustrative ranging tool embodiment.

Tool 26 may be an electromagnetic ranging tool of the type illustrated in FIG. 2. Ranging tool 302 includes a transmit antenna coil 304 set in a recess 306 around the circumference of the tool. The illustrated transmit antenna 304 is positioned at a 45° tilt angle to provide an azimuthal asymmetry to the transmitted electromagnetic signal. The tool further includes two tilted receive antenna coils 310, 312 in a second recess around the tool circumference. Antenna 312 is parallel to the transmit antenna 304, while antenna 310 is perpendicular to the transmit antenna. Antennas 310 and 312 are shown as being collocated, but this is not a requirement. The disclosed methods can be employed with a single transmit-receive antenna pair, which can be collocated if desired, but it is expected that the use of additional transmit-receive antenna pairings will provide better ranging performance. As will become clear, the antenna spacings and tilt angles can be varied as desired, so long as at least one of the transmit or receive antennas provides azimuthal sensitivity. A nonconductive filler material may be used to fill the recesses to seal and protect the antenna coils.

Figure 3:
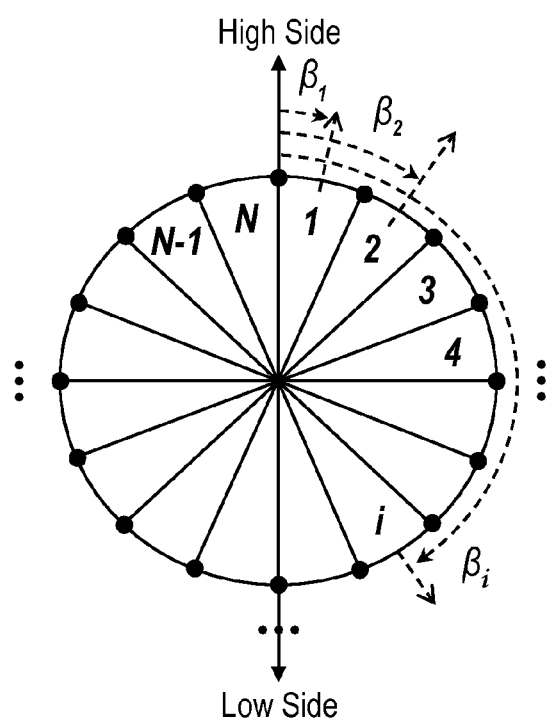
FIG. 3 shows an illustrative azimuthal binning system.

The tool includes processing electronics to measure the receive antenna responses to each transmitted signal. As the tool rotates, the processing electronics collect the measurements and associate each of them with an azimuthal bin based on the measured tool orientation at the time the measurement was acquired. At a given depth or position within the borehole, the tool combines the measurements within each bin (e.g., by averaging) to improve azimuthal measurement accuracy. FIG. 3 shows an illustrative azimuthal bin arrangement in which the circumference of the borehole is divided into N equally-sized sectors. The sector covered by each azimuthal bin is determined by the bin sizes and the index point from which the bin angles are measured. FIG. 3 shows a binning system in which the azimuthal angles are measured from the high side of the borehole (or, in the case of a vertical borehole, the north side), which also serves as the edge for the first bin. In the absence of magnetic interference, each bin spans $2\pi/N$ radians, and the angles that best represent the bin's direction are the center angles $(2i-1)\pi/N$, where i is the bin index ranging from 1 to N.

Figure 4A:
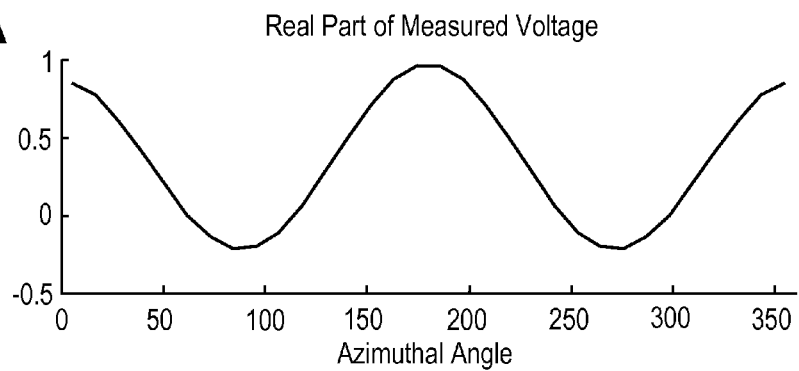
FIGS. 4A-4B show real and imaginary components of an expected voltage response.
Figure 4B:
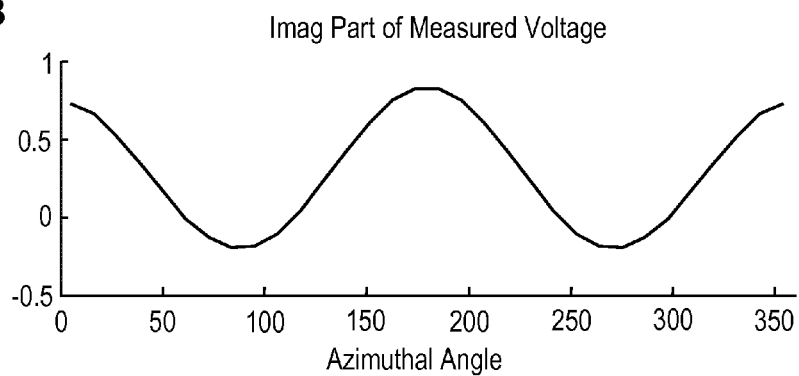

FIGS. 4A and 4B show an illustrative azimuthal dependence that would expectedly be observed by an electromagnetic ranging tool in the vicinity of an existing well. If the amplitude of the receive signal voltage is represented as complex number, it would have the real component represented in FIG. 4A and the imaginary component represented in FIG. 4B. As described in detail in the co-pending patent application Ser. No. 13/116,150 filed May 26, 2011 and titled "Real time determination of casing location and distance with tilted antenna measurement" by inventors M. Bittar, S. Li, and H. Wu, the azimuthal dependence of the real and imaginary components can be cast in the form $$V_R^T(\beta_i) = V_1 \cos 2\beta_i + V_2 \cos \beta_i + V_3 \quad (1)$$

where $\beta_i$ are the representative azimuthal angles shown in FIG. 3 and $V_1, V_2,$ and $V_3$ are complex amplitudes determined by the characteristics of the tool, the conductivity of the well casing, and the distance between the two.

The points on the curve are determined by combining (e.g., averaging) the measurements in each bin. Stated in another way, all of the sample measurements associated with an azimuthal angle within an angular range associated with a given bin at a given position along the length of the borehole are combined to obtain a representative measurement for that bin. If the tool is assumed to rotate at a constant rate (as is usually the case), the various bins should have a comparable number of sample measurements for each bin. FIGS. 4A-4B represent a simulated experiment in which 20 samples have been collected for each bin.

Figure 5:
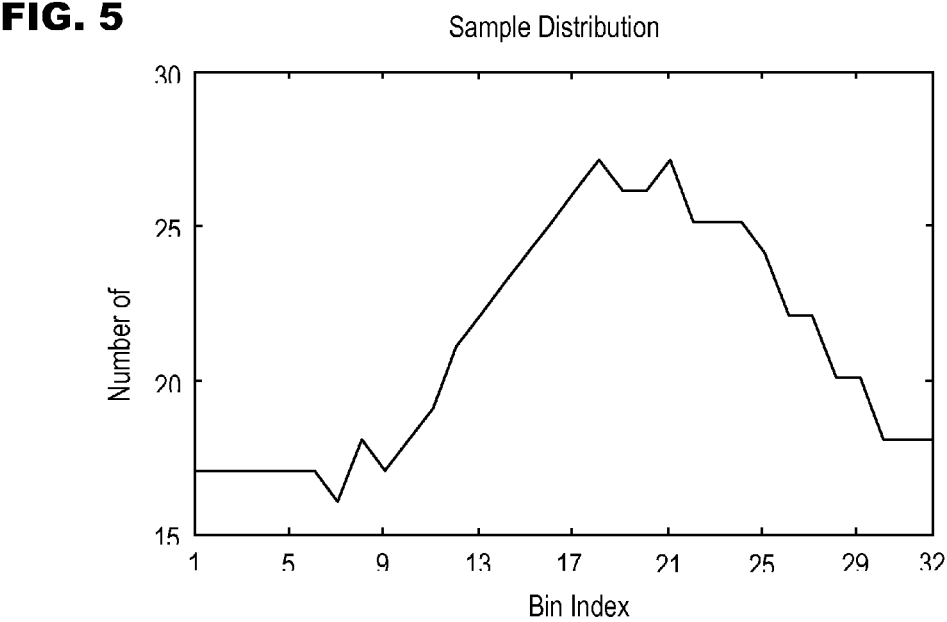
FIG. 5 is a histogram of an illustrative sample distribution over a range of azimuthal bins.
Figure 6A:
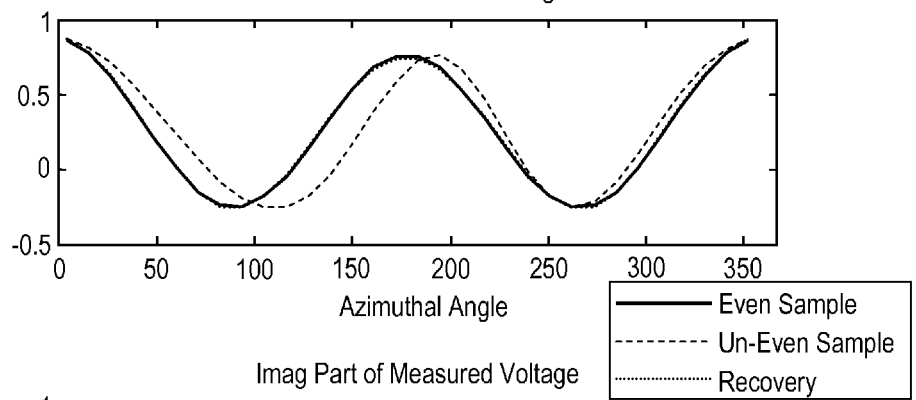
FIGS. 6A-6B compare an expected voltage response with an illustrative response subject to magnetic interference and an illustrative response compensated for magnetic interference.
Figure 6B:
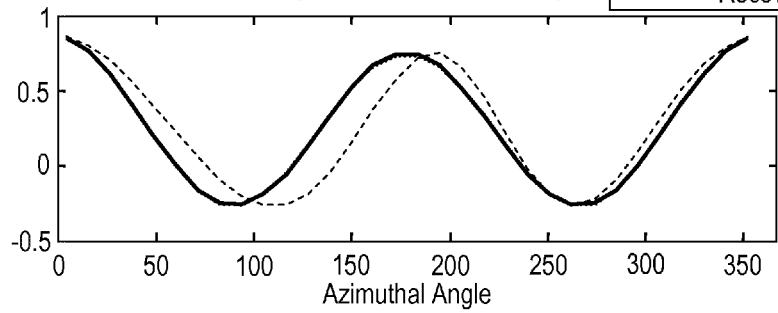

It has been observed that magnetic interference results in a skewing of the sample distribution such as that illustrated in FIG. 5. In the illustrated example, the numbers of samples in each bin ranges from as low as 16 to as high as 27. Moreover, the distribution is not entirely random, but rather it exhibits a strong peak and valley. If no attempt to correct for this skew, the azimuthal dependence becomes distorted as indicated in FIGS. 6A and 6B. The solid curves correspond to the non-interference example of FIGS. 4A-4B. The broken line curves show the azimuthal dependence distortion that results from magnetic interference. Also shown in FIGS. 6A-6B are dotted line curves that result from the interference compensation approach described below. The dotted line curves are nearly perfectly coincident with the solid line curves, lending support to the validity of this approach.

The described compensation approach relies on two assumptions: (1) the tool is rotating at a constant rate unrelated to the sampling rate, and (b) the number of samples for each bin is recorded as a function of tool depth (and preferably tracked in real time). Because the tool rotates at a constant rate, any skewing that the magnetic interference causes in the sample distribution occurs because the magnetic interference has essentially re-sized the azimuthal bins. The bins with a relatively greater number of samples are larger than the bins with a relatively fewer number of samples, and the relative size of the bins is approximately equal to the ratio between their sampling density. based on this observation, the representative angle for each bin can be recalculated based on $S_i$, the number of samples in each bin:

$$\beta_i' = 2\pi \frac{-\frac{S_i}{2} + \sum_{k=1}^{i} S_k}{\sum_{k=1}^{N} S_k}, \quad i = 1, L, N \quad (2)$$

The factor of $2\pi$ represents the full circumference of the circle. The summation in the denominator represents the total number of samples in all bins. The summation in the numerator is the number of samples in bin 1 through bin i. Finally, the initial term in the numerator is an adjustment that corresponds to half of the width of bin i, so that the representative angle is located at each bin's center.

When the azimuthal dependence of the tool measurements is plotted as a function of the recalculated bin representative angles, the corrected dependence appears as shown by the dotted line in FIGS. 6A-6B. Note that this provides an excellent correspondence to the original curve for the non-interference case. Where it is desired to address the unevenness of the recalculated bin angles, interpolation may be used to determine appropriate signal values for the original representative bin angles. To extract the relevant signal components (e.g., the $V_1$, $V_2$, and $V_3$ values from equation (1)), a Fourier transform or curve-fitting operation can be applied into the measured signals with the corrected angular dependence. To facilitate the extraction of these components, the system (as described in copending patent application Ser. No. 13/116, 150), the system may first calculate a "diagonal" component and a "cross" component. The diagonal component $V_{diag}$ is calculated by the average of two measurements where their azimuthal directions are opposite to each other:

$$V_{diag}(\beta_i) \equiv \frac{V_R^T(\beta_i) + V_R^T(\beta_j)}{2} = V_1 \cos 2\beta_i + V_3 \quad (3)$$

where $\beta_j$ is the azimuthal angle opposite to $\beta_i$. The cross-component $V_{cc}$ is defined by the subtraction of one bin measurement from the bin measurement with opposite azimuthal direction:

$$V_{cc}(\beta_i) \equiv \frac{V_R^T(\beta_i) - V_R^T(\beta_j)}{2} = V_2 \cos \beta_i \quad (4)$$

These components can be quite different if calculated with and without first compensating for magnetic interference. FIGS. 7A-7B show the real and imaginary parts of the diagonal component signal, while FIGS. 8A-8B show the real and imaginary parts of the cross-component signal derived from the curves in FIGS. 6A-6B. The compensated signals more closely mirror the expected signal behaviors than do the signals which have not been corrected for magnetic interference. These theoretical models have been verified through the use of a water-tank experiment. A rotatable electromagnetic ranging tool was placed in a water tank near a casing joint. The water resistivity was 1Ω·m. The magnetic interference encountered in this experiments produced a sampling distribution similar to that shown in FIG. 5. The raw measurements before and after correcting for magnetic interference match the behaviors of the model data and validates the proposed compensation technique.

Figure 9:
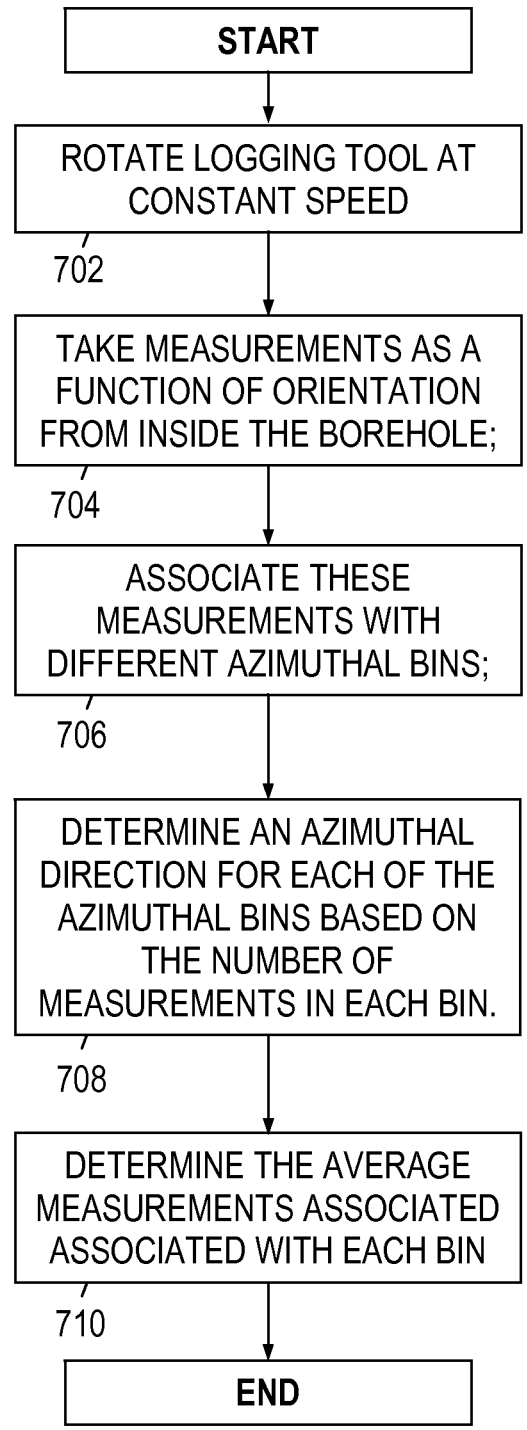
FIG. 9 is a flow diagram of an illustrative logging method having magnetic interference compensation.

FIG. 9 is a flow diagram of an illustrative downhole logging method with magnetic interference correction. In block 702, an azimuthally sensitive logging tool is rotated at a substantially constant speed. As the logging tool rotates, it acquires azimuthally-sensitive measurements as a function of orientation from inside the borehole in block 704. In block 706, the measurements taken are associated with different azimuthal bins. Based on the number of measurements associated with each bin, an azimuthal direction for each of the bins is determined in block 708. In block 710, the tool combines the measurements associated with each bin to obtain a representative measurement value.

Thus a magnetic interference compensation technique has been presented which is applicable to various logging systems and methods. At least one downhole logging method embodiment is disclosed which compensates for magnetic interference is used to recover a true azimuthal dependence for the measured signals. This method includes taking measurements as a function of tool position and orientation from inside a borehole. The measurements are associated with different azimuthal bins, and an azimuthal direction is determined for each azimuthal bin based at least in part on the number of measurements in each bin. These measurements can include formation resistivity, magnetic field, and formation density. At least one disclosed system embodiment includes an azimuthally sensitive logging tool, a processor, and a memory storage device. The processor determines an azimuthal direction for each of the azimuthal bins based at least in part on the relative numbers of measurements in each bin.

One of ordinary skill, upon reading the foregoing description, will recognize certain suitable modifications and equivalents. For example, the skewing distribution may be expected to have a sinusoidal or polynomial dependence on angle. Rather than determining bin sizes independently, the system may fit an expected curve to the distribution and determine the relative bin sizes based on the curve. The foregoing description focuses on electromagnetic ranging measurements, but the principles are readily applicable to all azimuthally sensitive logging tools including resistivity tools, sonic tools, and density tools. It is intended that the following claims be interpreted to embrace all such variations and modifications.

What is claimed is:

1. A downhole logging method that comprises:
    using a magnetometer to track an orientation of a rotating downhole tool as the tool acquires azimuthally-sensitive measurements from inside a borehole;
    based on said orientation, associating said measurements with different azimuthal bins; and
    determining an azimuthal direction for each of said azimuthal bins based at least in part on a ratio of the number of measurements in each bin to the number of measurements in all bins.

2. The method of claim 1, wherein said rotating logging tool rotates at a constant speed for each rotation.

3. The method of claim 1, wherein said rotating logging tool acquires said measurements as a function of tool position along said borehole.

4. The method of claim 1, further comprising determining the size of each bin based at least in part on a ratio of the number of measurements in each bin to the number of measurements in all bins.

5. The method of claim 1, wherein a sampling number for each of said azimuthal bins are recorded and provided in real-time for each rotation.

6. The method of claim 1, wherein said determining an azimuthal direction for each bin is repeated at each major depth.

7. The method of claim 1, wherein said determining an azimuthal direction for each bin is repeated at each rotation.

8. The method of claim 1, wherein said measurements include at least one of: formation resistivity, magnetic field, and formation density.

9. The method of claim 1, wherein said measurements and said azimuthal directions is used for post-processing.

10. A downhole logging system that comprises:
    an azimuthally sensitive logging tool to obtain measurements;
    a memory device to store said measurements in different azimuthal bins; and
    a processor that retrieves said measurements from said tool and determines for each bin a related azimuthal direction based at least in part on a ratio of the number of measurements in that bin to the number of measurements in all bins.

11. The system of claim 10, wherein said logging tool is rotated at a constant speed for each rotation to obtain said measurements.

12. The system of claim 10, wherein said logging tool is used during wireline logging, if said tool is rotating.

13. The system of claim 10, wherein said logging tool is used during logging while drilling (LWD).

14. The system of claim 10, wherein said logging tool is used during measurements while drilling (MWD).

15. The system of claim 10, wherein said logging tool further comprises a tilted antenna.

16. The system of claim 15, wherein said tilted antenna includes various tilt angles.

17. The system of claim 15, wherein said logging tool takes measurements as a function of orientation from inside a borehole.

18. The system of claim 15, wherein said measurements include at least one of: formation resistivity, magnetic field, and formation density.

19. A downhole logging system that comprises:
- an azimuthally sensitive logging tool that obtains measurements;
- a memory device that stores said measurements in different azimuthal bins; and
- a processor that retrieves said measurements from said tool and determines an adjusted azimuthal direction for each bin, wherein the adjusted azimuthal direction for each bin i is representable as:

$$\beta_i' = 2\pi \frac{-\frac{S_i}{2} + \sum_{k=1}^{i} S_k}{\sum_{k=1}^{N} S_k}, i = 1, \ldots, N$$

where $S_i$ is the number of samples in bin i and N is the number of bins.

20. A downhole logging method that comprises:
- using a magnetometer to track an orientation of a rotating downhole tool as the tool acquires azimuthally-sensitive measurements from inside a borehole;
- based on said orientation, associating said measurements with different azimuthal bins; and
- determining an azimuthal direction for each of said azimuthal bins, wherein the azimuthal direction for each bin i is representable as:

$$\beta_i' = 2\pi \frac{-\frac{S_i}{2} + \sum_{k=1}^{i} S_k}{\sum_{k=1}^{N} S_k}, i = 1, \ldots, N$$

where $S_i$ is the number of samples in bin i and N is the number of bins.

* * * * *